July 25, 1939.  R. D. WELSH  2,166,980
FILTERING FUNNEL
Filed Nov. 27, 1935
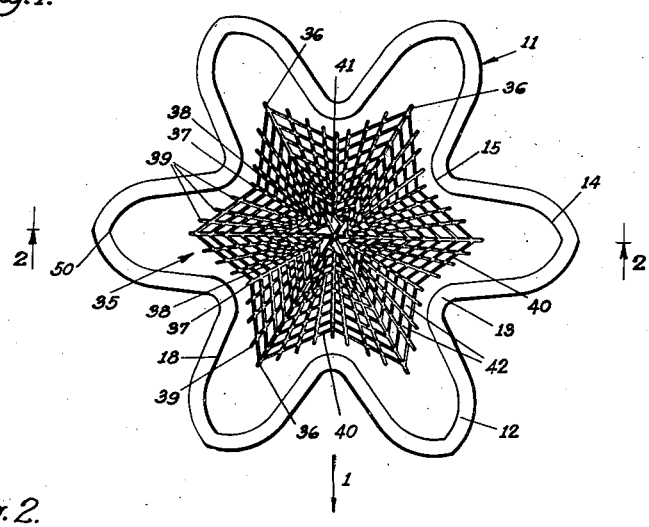
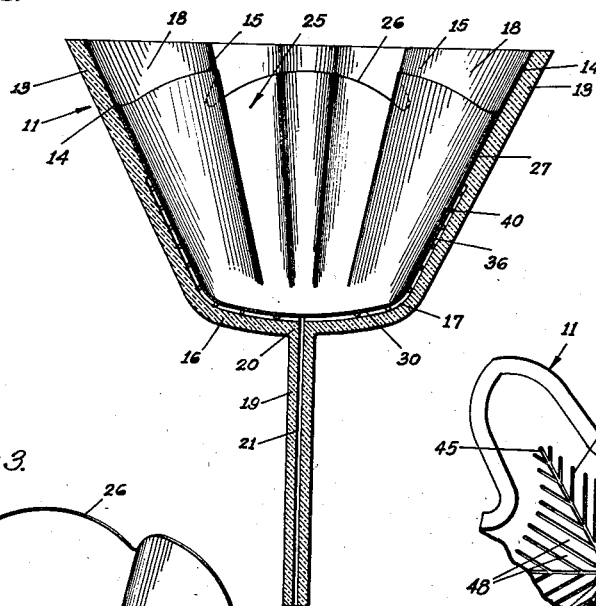
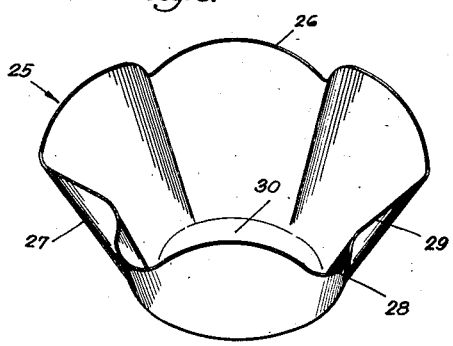
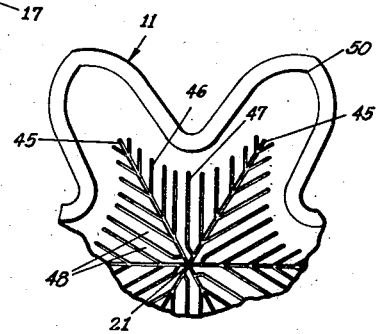
Inventor
Robert D. Welsh
by Hazard and Miller
Attorneys.

Patented July 25, 1939

2,166,980

UNITED STATES PATENT OFFICE 2,166,980

FILTERING FUNNEL

Robert Douglas Welsh, Los Angeles, Calif.

Application November 27, 1935, Serial No. 51,841

10 Claims. (Cl. 210—160)

My invention relates to a funnel of a special design for use with filter paper for filtering through the filter paper. The usual types of filter paper are in the form of circular disks, which, with many types of funnels require to be folded into a cone-shaped structure for inserting in conical funnels. This develops several thicknesses on one side of the folded filter paper which is a disadvantage. Other manners of folding the filter paper require that this have a series of folds developed from the peripheral edge towards the center, but this also makes it difficult to fold the filter paper to properly fit the funnel.

An object and feature of my invention is the construction of a funnel in which the main characteristics of the shape of the funnel cause the folding of the filter paper which is in the form of a disk, to conform to the side walls of the funnel by making preferably reverse convex and concave curves in the paper considered relative to the axis of the funnel so that the paper is only one layer in thickness at any part of the funnel.

Another feature of my invention consists of having the base of the funnel formed on a concave curve considered transversely of the axis of the funnel so that there is no sharp angle or point produced at the lower end of the filter paper. The funnel therefore at all points of contact by the filter paper only has one thickness of paper and no sharp corners or folds tending to tear the paper.

One of the difficulties of the present type of funnels used for filtering with filter paper, especially where a suction is employed to hasten the passage of the filtrate through the filter paper, resides in the tearing of the paper, of puncturing at unsupported portions of the paper and thus allowing the filtrate to pass through the perforation.

A further object and feature of my invention is constructing the inside surface of the filter with various grooves and passages, so arranged that they will lie underneath the filter paper, but the paper will have adequate support by the surfaces with which it directly contacts. With my invention the distance to be bridged by the filter paper across any of the channels, grooves or passages in the funnel is so small that there is little likelihood of the paper being torn or perforated at these unsupported portions. This construction also gives a large area of the filter paper through which the filtrate may pass and thus flow downwardly through the channels, grooves or passages in the main surface of the funnel and the base portion to the hollow stem of the funnel, the filtrate thus passing into a receptacle.

Another feature of my invention relates to the connection of the hollow stem to the base of the filter, in such a manner that the filter paper is supported substantially on all sides of the opening through the hollow stem, so that the paper cannot be drawn into the stem and thus torn or perforated; the channels, grooves or passages however, which are formed in the sides of the funnel lead the filtrate to the passage or duct through the hollow stem.

My invention is illustrated in the accompanying drawing, in which:

Fig. 1 is a plan taken in the direction of the arrow 1 of Fig. 2 of the funnel.

Fig. 2 is a vertical section on the line 2—2 of Fig. 1 in the direction of the arrows.

Fig. 3 is a perspective view of a filter disk formed into a cup shape to fit the funnel.

Fig. 4 is a partial plan view of an alternative form of grooves or channels in the funnel.

The funnel has a sloping side wall structure 11, this being constructed with a plurality of outwardly bent sections 12 separated by inwardly bent portions 13. Thus the outwardly bent portions 12 have a concave curvature 14 on the inside and indentations 13 have a convex curvature 15 considered at right angles to the axis of the funnel. Thus the top of the funnel may be considered as somewhat star-shaped with rounded corners. The thickness of the material forming the funnel is governed by the strength of material necessary and for the particular purpose of the funnel.

Both the projections 12 and indentations 13 taper downwardly from the top part toward the bottom of the funnel so that the funnel has a base 16, this having a concave curvature considered transverse to the axis of the funnel and engaging at the corners 17 into the inside surfaces 14 and 15 and the portions 18 of these inside surfaces connecting the convex and concave curved portions adjacent the base.

The stem or spout 19 is connected centrally of the base, as indicated at 20, this stem being of a length desired for the particular work for which the funnel is to be used and is preferably cylindrical in order to make a tight seal with a stopper. The stem has a duct 21 for the discharge of filtration.

By this construction of the funnel the filter paper designated by the numeral 25, which is usually marketed in the form of a circular disk, may be inserted in the funnel and pressed to conform to the convex and concave curvatures of the projections and the indentations 13. However, when a liquid to be filtered is poured on top of the filter paper the filter paper quickly conforms to the shape of the funnel. Thus, the peripheral edge 26 is bent upwardly and the side wall structure 27 formed by the filter paper takes the concave curves 28 and convex curves 29 to accommodate itself to the shape of the projections 12 and indentations 13. The bottom 30 has a slope and downward curvature conforming to the base of the funnel and the junction of the base with the side walls. It will thus be seen that there is no fold in the filter paper and no overlapping of one part over the other.

In order to carry away the filtrate from underneath the filter paper after passing therethrough and thus develop a large area of the filter paper suitable for proper functioning, I employ a grooved and channeled structure 35 in the side walls and bottom of the funnel. These may be of varying designs, for instance, in Fig. 1 there are illustrated main radial grooves 36 which extend from the duct 21 on the bottom of the funnel and upwardly in the projections 12 having the concave curvature. There are also secondary radial grooves 37 which may be considered as following up the ridges formed by the convex curves 15 of the indentations. These are indicated as connecting, as shown at 38, with the main grooves 36. There are also a third set of somewhat radial grooves 39 formed intermediate between the grooves 36 and 37, that is, between the concave curve 14 of the projections and the convex curves 15 of the indentations. A series of intersecting grooves 40 vary the contours to a certain extent but always have a downward slope leading to one or more of the radial grooves. These are shown at the upper parts of the funnel as intersecting several of the radial grooves but, however, as these radial grooves converge it is necessary to reduce the number of such grooves which extend to the center of the base and also the number of intersecting grooves so that these grooves may vary in their cross measurements and provide ample supporting surfaces indicated at 41 for the filter paper at the bottom of a filter near the duct 21 in the stem or spout. There are also supporting surfaces 42 of varying sizes between the radial and the intersecting grooves, thus giving adequate support for the one thickness of filter paper to prevent the paper from tearing or puncturing when in use.

It will thus be seen by the construction shown in Fig. 1 that the grooves form, in effect, a grid type of structure, the various grooves or channels forming the grid always having a lead downwardly toward the duct 21 so that filtrate passing through the filter paper may have a free discharge under the filter paper and thus allow rapid flow of liquid in the filtering whether this is done with suction by partial vacuum exerted on the discharge end of the duct 21.

In Fig. 4 I show a modified construction in which there are a series of main radial grooves 45 which extend from the central duct 21 upwardly on the concave surfaces 14 of the projection 12. Entering into these main grooves there are a series of secondary grooves 46 which follow the downward slope caused by the general conical shape of the funnel in as direct a line as possible to the main grooves 45. These secondary grooves may be considered as having a central groove 47 of which there is one located on the convex curve 15 of the indentations 13, the remaining secondary grooves 46 being in a general aspect parallel to the grooves 47. The main characteristic of the type of grooves shown in Fig. 4 is that these are somewhat like the veins in a leaf, there being a main groove and all of the secondary grooves of one portion of the funnel leading into the main groove. In this construction the interior funnel surface 48 is such as to give sufficient support to the filter paper and the channels or grooves are sufficiently narrow so that there is but little chance of the filter paper puncturing or tearing.

The manner of operation and functioning of my invention may be considered as follows:

As above described, due to the projections 12 and the indentations 13, all formed within the general inverted conical shape of the funnel and the curved bottom the filter paper becomes shaped when inserted in the funnel and liquid poured therein to the shape of the funnel without any folds or overlap and presenting a single filtering surface at all portions of the funnel. The various grooves, either in the form of the grid construction of Fig. 1, or the main construction of Fig. 4, provide relief channels for the flow of the filtrate after passing through the filter paper. Thus a large portion of the surface of the filter paper may function usefully in filtering the liquid. Hence, with my type of funnel gravity filtering is much more rapid than with the ordinary types of filters and if it is desired to increase the rapidity of filtering the suction or partial vacuum system may be used by inserting the stem or spout 19 in a vessel which may be evacuated.

I find it of advantage to form the inside concave surface 14 with a fairly pronounced corner as indicated at 50 at the upper part of the funnel. This more or less sharp corner broadens out towards the lower parts of the funnel as the concave curve gradually increases in its radius of curvature. Thus the concave curves more or less flatten out towards the bottom of the funnel; likewise the interior convex curves, while quite pronounced at the upper part of the funnel, likewise flatten so that the two curves more or less merge, forming a circle adjacent the bottom of the funnel.

It is to be noted by my invention that the filter paper is not folded but that at all parts of the funnel it is a single thickness of paper in contact with the funnel and furthermore, that the paper extends above the grooves in the funnel so that there is a close contact of the upper portion of the paper and the smooth walls of the funnel. This forms an air seal to permit development of a vacuum in the drainage grooves below the filter paper for the flow of the filtrate.

Various changes may be made in the principles of my invention without departing from the spirit thereof as defined by the appended claims.

I claim:

1. A funnel having an axial outlet at the bottom, outwardly and upwardly flared side walls, said side walls having projections with internal concave surfaces and indentations with internal convex surfaces, the concave and convex surfaces merging together and the bottom of the funnel between the side walls and the spout having a somewhat concave configuration on the axial planes through the projections whereby a circular filter paper inserted in the funnel conforms to the inside surface of the funnel without folds or overlaps of the filter paper, the inside surface of the funnel having main radial grooves extending outwardly from the outlet in the inside concave surfaces of the projections, and having secondary substantially radial grooves extending outwardly on the convex surfaces of the indentations, certain of the grooves merging together at positions spaced from the spout leaving supporting surfaces therebetween to cause the filter paper to bridge the grooves.

2. A funnel having an axial outlet at the bottom, outwardly and upwardly flared side walls, said side walls having projections with internal concave surfaces and indentations with internal convex surfaces, the concave and convex surfaces merging together and the bottom of the funnel between the side walls and the spout having a somewhat concave configuration on the axial planes through the projections whereby a circular filter paper inserted in the funnel conforms to the inside surface of the funnel without folds or overlaps of the filter paper, there being a series of main grooves extending outwardly radially from the outlet in the concave surfaces of the projections, secondary grooves extending outwardly substantially radial from the spout on the convex surfaces of the indentations, the secondary grooves merging into the main grooves at positions spaced from the outlet, there being a third set of grooves between the concave and convex surfaces of the projections and indentations merging with the main grooves at positions spaced from the spout, there being supporting surfaces on the inside of the funnel between the grooves to support the filter paper in bridging the grooves.

3. In a device as described, a filtering funnel having an axial outlet, a bottom with an upper concave surface of relatively large radius concentric with the outlet, side walls extending upwardly from the peripheral portion of the bottom, the said side walls having an internal surface with indentations and projections extending in an up and down direction and increasing in size from bottom to top, the indentations having a convex curvature and the projections a concave curvature considered on transverse planes, the inside surface of the projections and the inside surface of the indentations merging with the concave base in gradual curves, such curves being concave on vertical planes through the axis of the outlet, the various concave and convex curves considered in vertical and transverse planes having a somewhat gradual area of junction whereby a disc-like sheet of filter paper when inserted in the funnel may have a central base portion rest on the base and the other portions conform to the shape of the indentations and projections of the side walls without an overlapping fold in the filter paper.

4. A filtering funnel having an outlet at the bottom, a bottom surface and outwardly and upwardly flared side walls having internal concave and convex surfaces merging together and merging into the bottom of the funnel, the inside surface of the funnel having main radial grooves extending outwardly from the outlet in the concave surfaces and having secondary substantially radial grooves extending outwardly on the convex surface, certain of the grooves merging together without substantial widening of the grooves at positions spaced from the outlet leaving supporting surfaces therebetween to cause the filter paper to bridge the grooves.

5. A filtering funnel having an axial outlet at the bottom, a bottom portion extending outwardly therefrom and upwardly and outwardly flared side walls, said walls having convex and concave inside surfaces considered transversely to the axis of the funnel, the said surfaces merging together and merging with the bottom, there being a series of main grooves extending outwardly radially from the outlet in the concave surfaces, secondary grooves extending outwardly substantially radial from the outlet on the convex surfaces, the secondary grooves merging without substantial widening of the groove into the main grooves at positions spaced from the outlet, there being a third set of grooves between the concave and convex surfaces merging with the main grooves at positions spaced from the outlet, there being supporting surfaces on the inside of the funnel between the grooves to support the filter paper in bridging the grooves.

6. In a device as described, a filtering funnel having an axial outlet, a bottom with an upper concaved surface of relatively large radius, concentric with the outlet, side walls extending upwardly from the peripheral portion of the bottom, the side walls having an internal surface with indentations and projections extending in an up and down direction and increasing in size from bottom to top, the indentations having a convex curvature and the projections a concave curvature considered on transverse planes, the inside surface of the projections and the inside surface of the indentations merging with the concave base, the radius of curvature between the base and the inside surface of the projections being of lesser radius than the radius of the base and the concave curve of merging of the inside surfaces of the indentations and of the base, the various concave and convex curves considered in vertical and transverse planes having a somewhat gradual area of junction whereby a disc-like sheet of filter paper when inserted in the funnel may have a central base portion rest on the base and the other portions conform to the shape of the indentations and projections of the side walls without there being an overlapping fold in the filter paper.

7. In a device as described and claimed in claim 6, the bottom and side walls having main and secondary grooves, the main grooves connecting to the outlet and the secondary grooves merging without substantial widening of the grooves into the main grooves at positions spaced from the outlet, the said main and secondary grooves extending partly up the sides of the indentations and projections, the upper side walls of the indentations and projections being smooth to form a close contact with the upper part of filter paper to thereby form a vacuum seal, the opposite sides of the grooves being adapted to support filter paper bridging across the grooves and the grooves being sufficiently narrow to prevent the paper being drawn into the grooves by a vacuum or the passage of filtrate or collection of precipitate and to prevent tearing of the paper.

8. In a device as described and claimed in claim 6, the bottom and side walls having main and secondary grooves, the main grooves connecting to the outlet and the secondary grooves merging without substantial widening of the grooves into the main grooves at positions spaced from the outlet, the said main and secondary grooves extending partly up the sides of the indentations and projections, there being a third set of grooves intersecting the main and secondary grooves, the third set of grooves each having a downward slope towards the outlet, the upper side walls of the indentations and projections being smooth to form a close contact with the upper part of filter paper to thereby form a vacuum seal, the opposite sides of the grooves being adapted to support filter paper bridging across the grooves and the grooves being sufficiently narrow to prevent the paper being drawn into the grooves by a vacuum or the passage of filtrate or collection of precipitate and to prevent tearing of the paper.

9. In a device as described, a filtering funnel having an axial outlet, a bottom structure surrounding the spout and side walls extending outwardly and upwardly from the bottom structure, the side walls and the bottom structure having a series of main grooves leading in substantially straight radial lines to the outlet when viewed from a plane at right angles to the axial outlet and above the funnel, there being secondary grooves in the side walls and the bottom structure sloping towards the outlet and each merging at its lower end with a main groove, the place of merging being spaced from the outlet of the spout and the grooves at the place of merging being without substantial widening of the grooves, the upper part of the side walls being smooth without grooves whereby a filter paper placed in the funnel contacts the smooth surface to thereby form a vacuum seal, the opposite sides of the grooves being adapted to support filter paper bridged across the grooves and grooves being sufficiently narrow to prevent the paper being drawn into the grooves by a vacuum in the grooves or the passage of filtrate or collection of precipitate and to prevent tearing of the paper.

10. In a device as described and claimed in claim 9, the side walls and the bottom structure having a third set of grooves, each groove of the third set having a downward inclination towards the outlet and intersecting secondary grooves.

ROBERT DOUGLAS WELSH.